(No Model.)
J. T. McROY.
CONDUIT.
No. 583,926. Patented June 8, 1897.
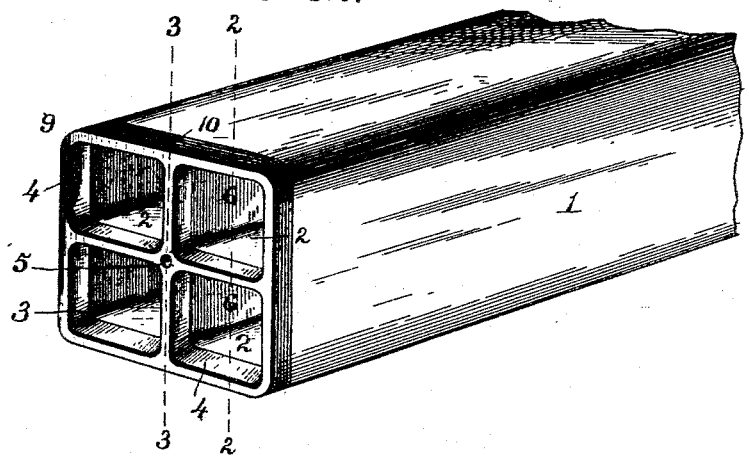
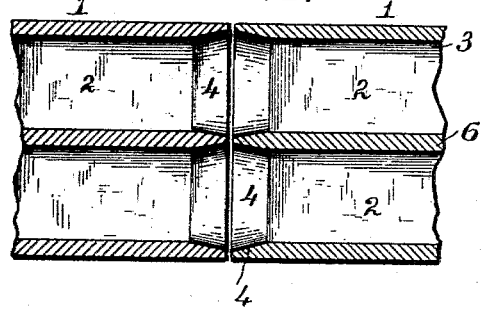
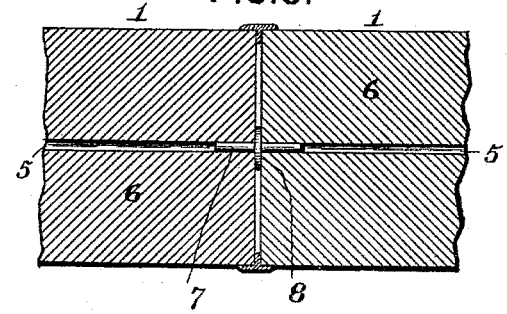
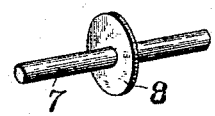
ATTEST.
Wm J Gelston.
E S Bailey
INVENTOR.
John T. McRoy.
By J. Henry Kaiser
Attorney

UNITED STATES PATENT OFFICE.

JOHN T. McROY, OF CHICAGO, ILLINOIS.

CONDUIT.

SPECIFICATION forming part of Letters Patent No. 583,926, dated June 8, 1897.

Application filed March 22, 1897. Serial No. 628,644. (No model.)

*To all whom it may concern:*

Be it known that I, JOHN T. MCROY, a citizen of the United States, residing at Chicago, in the county of Cook and State of Illinois, have invented certain new and useful Improvements in Conduits; and I do hereby declare the following to be a full, clear, and exact description of the invention, such as will enable others skilled in the art to which it appertains to make and use the same.

This invention relates to underground conduits for electric wires in which a series of pipes having a plurality of ducts, channels, or passages for the reception and insulation of the wires are laid end to end beneath the ground and their abutting ends so disposed relative one to the other and secured and sealed in position as to present practically a single homogeneous conduit having separate and continuous unbroken ducts in which a plurality of wires may afterward be introduced.

My invention has for its objects to provide means for insuring the accurate alinement and matching of the conduit-sections one with another to facilitate the laying of the conduit and to maintain the sections in proper alinement after the conduit has been laid, to provide improved means for so matching the ends of the conduit-sections that no obstructions will present themselves to the free passage of the wires at the meeting ends of the wires, and finally to provide means for facilitating the sealing of the meeting ends of the conduit-sections.

To these ends my invention consists in the features and in the combination, construction, or arrangement of parts hereinafter described, and particularly pointed out in the claim following the description, reference being had to the accompanying drawings, forming a part of this specification, wherein—

Figure 1 is a perspective view; Fig. 2, a longitudinal section on line 2 2 of Fig. 1; Fig. 3, a longitudinal section on line 3 3 of Fig. 1; Fig. 4, a view of the dowel-pin.

Referring to the drawings, the numeral 1 indicates a conduit-section made of vitrified terra-cotta, preferably rectangular in cross-section and containing a plurality of longitudinal ducts or passages 2. Said ducts may consist of any preferred number, and their interior corners or edges 3 are preferably curved or rounded, as shown, in order to avoid presenting any sharp angles that might otherwise prove injurious to the conductors when the latter are drawn through the conduit. The ends of the ducts 2 are made flaring or beveled, as shown at 4, so that when the sections are laid end to end the meeting ends of the ducts will be of greater diameter or cross-sectional area than at any intermediate point, whereby no sharp edges or obstructions will be presented to interfere with the free passage of the conductors or to render liable the cutting or abrading of the wires or their insulation.

To facilitate the matching of the sections in the operation of laying the conduit and to insure the accurate alinement of the ducts when laid, I provide the ends of the sections with dowel-openings 5, said dowel-openings being preferably formed in the partition-walls 6 at the point where they intersect one another, and in said dowel-openings are arranged dowel-pins 7. Said dowel-pins are preferably formed of metal, and disposed on said pins intermediate their ends are flanges or collars 8. The said collars cause the dowel-pins to be properly placed within the dowel-openings and form abutments against which the adjacent ends of the partition-walls of the sections impinge, thereby preventing said pins from splitting the vitreous material about the dowel-openings and preventing the ends of the sections from being crushed, cracked, or broken by the impact of one section against the other. By means also of said dowel-pins and their collars no care need be taken in inserting the dowel-pins in their openings and no accuracy is necessary in laying the sections end to end, the dowel-pins themselves accurately centering each section relative to the next adjacent section.

The exterior end portions 9 of the sections are scored, grooved, or ribbed, as at 10, and when the sections are laid end to end the joint may be sealed by a simple cement coating laid around such grooved, scored, or ribbed ends, the irregular surface of the ends serving to bind such coating in place.

Having described my invention, what I claim is—

In an underground conduit, the combination with a series of sections laid end to end and each provided with a plurality of longitudinal ducts and dowel-openings formed in the ends of the intersecting partition-walls of said ducts, of metallic dowel-pins arranged in the dowel-openings at the adjacent ends of said sections, and collars arranged on said dowel-pins between the ends of the latter, substantially as described, and for the purpose specified.

In testimony whereof I affix my signature in presence of two witnesses.

JOHN T. McROY.

Witnesses:
HENRIETTA W. SCHOBER,
MARGARETTA M. SCHOBER.